United States Patent
Christ

(10) Patent No.: US 8,277,923 B2
(45) Date of Patent: Oct. 2, 2012

(54) FRICTION WELD ASSEMBLY OF A PLURALITY OF SUPERPOSED PLATES

(75) Inventor: Eberhard Christ, Tambach-Dietharz (DE)

(73) Assignee: Ejot GmbH & Co. KG, Bad Laasphe (DE)

( * ) Notice: Subject to any disclaimer, the term of this patent is extended or adjusted under 35 U.S.C. 154(b) by 276 days.

(21) Appl. No.: 12/667,451

(22) PCT Filed: Jun. 6, 2008

(86) PCT No.: PCT/EP2008/004546
§ 371 (c)(1),
(2), (4) Date: Mar. 31, 2010

(87) PCT Pub. No.: WO2009/003569
PCT Pub. Date: Jan. 8, 2009

(65) Prior Publication Data
US 2010/0186900 A1    Jul. 29, 2010

(30) Foreign Application Priority Data
Jul. 3, 2007   (DE) .......................... 10 2007 030 806

(51) Int. Cl.
*B32B 37/00*    (2006.01)

(52) U.S. Cl. ........................ 428/139; 156/73.5; 403/270

(58) Field of Classification Search .................. 156/73.5, 156/91, 92, 308.2, 308.4, 580, 581, 583.1; 403/270, 271, 272; 428/138, 139
See application file for complete search history.

(56) References Cited

U.S. PATENT DOCUMENTS

| | | | |
|---|---|---|---|
| 3,468,732 A * | 9/1969 | Hewitt ........................ | 156/73.5 |
| 6,763,568 B1 | 7/2004 | Mauermann et al. | |
| 2004/0041863 A1 | 3/2004 | Ioka et al. | |
| 2005/0172469 A1 | 8/2005 | Humpert et al. | |

FOREIGN PATENT DOCUMENTS

| | | |
|---|---|---|
| DE | 199 27 103 A1 | 12/2000 |
| JP | 2004-106046 A | 4/2004 |
| WO | WO-02/062518 A1 | 8/2002 |

\* cited by examiner

*Primary Examiner* — James Sells
(74) *Attorney, Agent, or Firm* — Birch, Stewart, Kolasch & Birch, LLP

(57) ABSTRACT

The invention relates to a friction weld assembly of a plurality of superposed plates, said plates being held together by a connection body which rests on the upper plate by means of a collar and is formed as a slender cone ending in a tip. The connection body comprises a driving element in the region of the collar thereof, for the attachment of a pressure and rotation tool. A girder formed from the slender cone and penetrating from the upper plate into the lower plate, and a girder protruding from the lower plate along the inner surfaces thereof, form a friction welding region extending onto the slender cone.

20 Claims, 2 Drawing Sheets

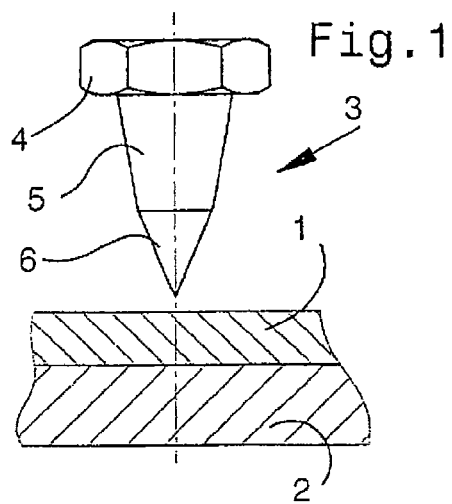
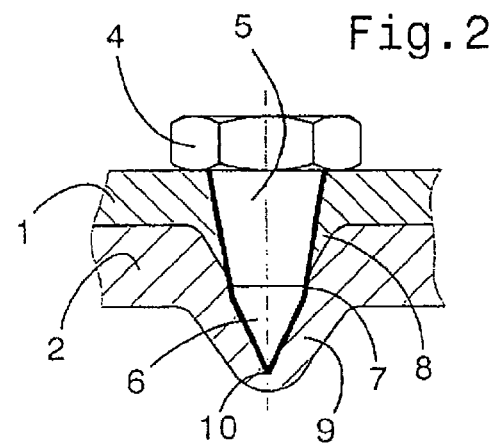
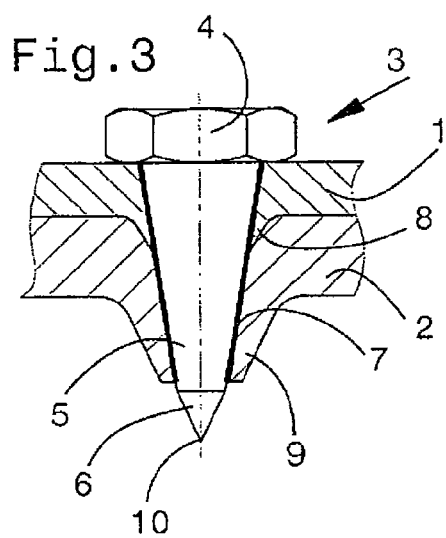
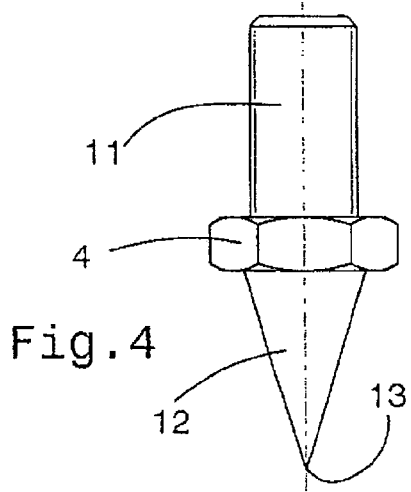
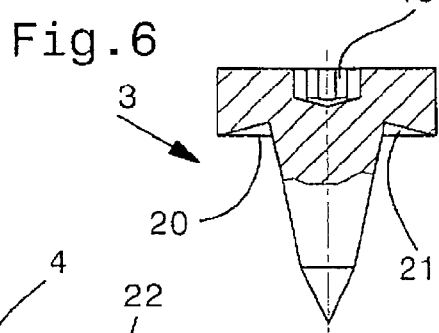
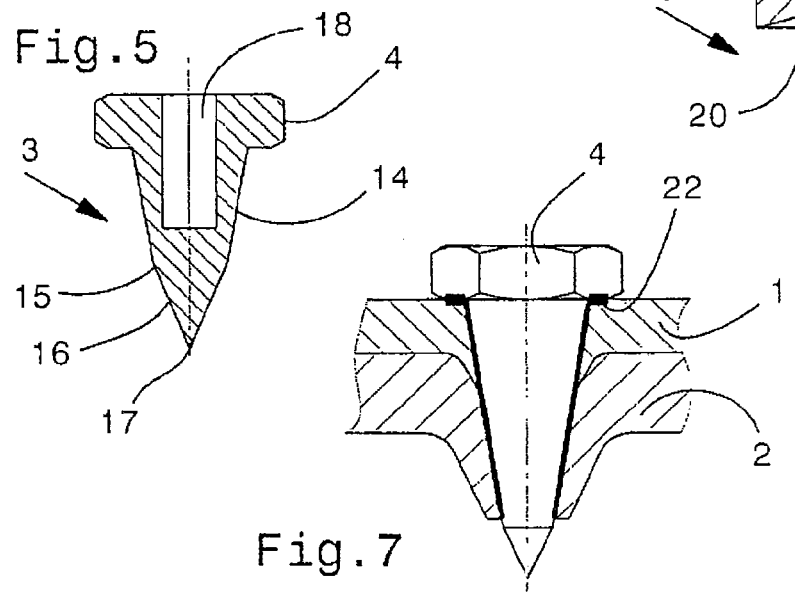

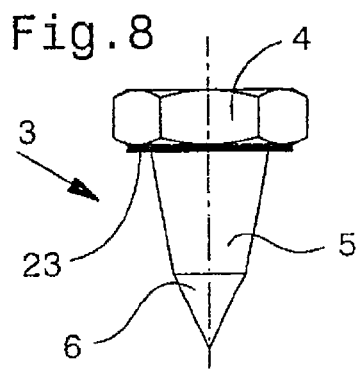
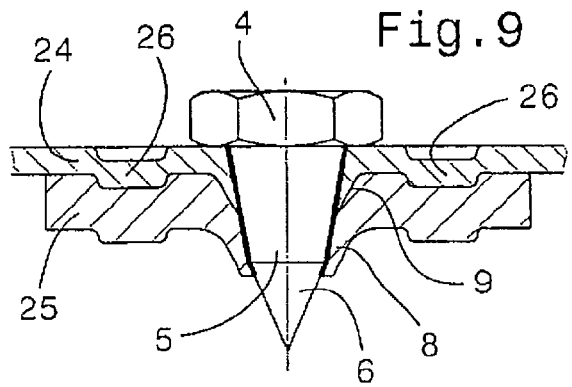
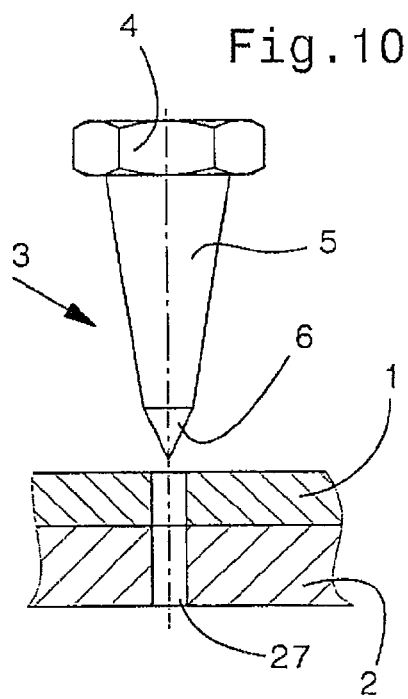
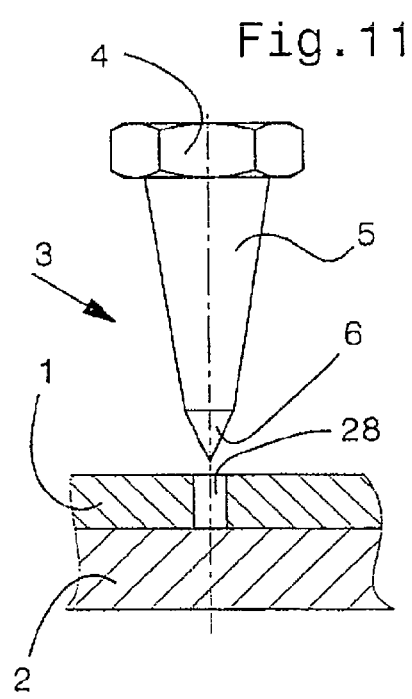
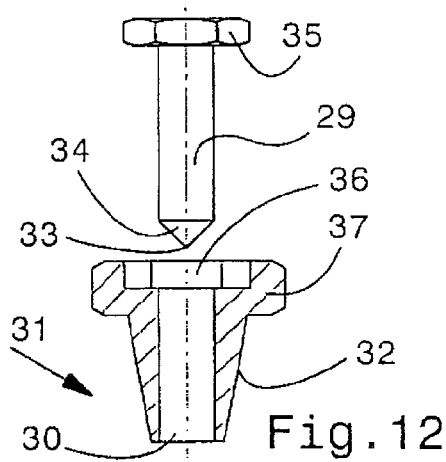
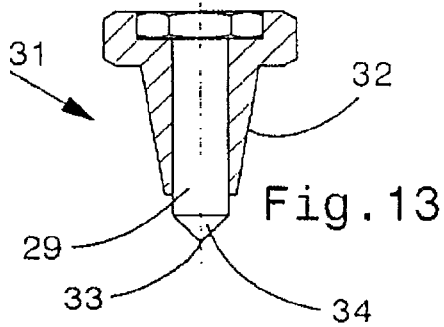

FRICTION WELD ASSEMBLY OF A PLURALITY OF SUPERPOSED PLATES

The invention relates to a friction weld assembly of a plurality of superposed plates, the plates being held together by a connection body which rests on the upper plate by means of a collar and is formed as a slender cone ending in a tip, wherein the connection body comprises a driving element in the region of the collar thereof, for attachment of a pressure and rotation tool.

Such a friction weld assembly is known from the WO-document WO 02/062518 A1. In FIG. 7c thereof, a connection body provided for such a friction weld assembly, is shown which comprises, at the one hand, a collar for abutting to an upper plate and, on the other hand, consists essentially out of a slender cone which forms a flat tip in direction away from the collar which tip is formed by a correspondingly obtuse angled, short cone in continuation of the slender cone. This connection body serves a purpose to be pressed under rotation into two superposed plates, until the collar abuts the upper plate. Because of the rotation of the connection body and the friction generated thereby between the connection body and the two plates, the material of the parts reaming one on the other, is plastified such that a friction weld zone is generated thereby from which material from the friction weld zone is exciting across the edge area of the upper side of the upper plate. Further connection bodies are shown in the FIGS. 9a to d which comprise driving elements in the region of the collar for the attachment of a pressure and rotation tool, wherein a hex-head and a groove are shown.

The invention is based on the object to provide the friction weld assembly mentioned above, with a particularly high strength by means of a special shape design. This is implemented, according to the invention, thereby that a girder formed from the slender cone and penetrating from the upper plate into the lower plate, and a girder protruding from the lower plate, form, along the inner surfaces thereof, a friction welding region extending to the slender cone.

The invention utilizes a special shape design of the friction weld zone, i.e. the girders forming during friction welding at a sufficient pressure and at high friction, which bring about the connection between the superposed plates not only b<means of the connection body but also by means of the material of the plates pressed out during the friction welding operation. Therein, in particular the girder formed from the upper plate and penetrating into the lower plate, is used which closely connects both of the superposed plates, and, thereby, transfers the forces which hold both plates together, primarily by means of the material of the plates pressed out during the friction welding which provide a sufficient amount of friction weld material for this purpose. The girder formed from the slender cone on the upper plate, extends into the material of the lower plate wherein the girder forms a continues friction weld zone like a pushing out of the material form the connection body as well as from the plates which connects both plates reliably to each other.

Conveniently, the slender cone is formed such that its tip is formed by a short cone which is steeper than the slender cone which extends over the essential length of the slender cone. Because of this shape design, the connection body can be pressed into both superposed plates with a corresponding axial pressure and upon rotation without difficulties, whereby it melts the material of the plates because of its friction at its periphery and, thereby, pushes forward as a cone having a corresponding force component, the melted material of the plates in axial direction, therein the connection body because of its shape, penetrates both superposed plates without difficulties and rapidly causes melting of the plates in the area of their abutment with the connection body, whereby an intimate connection with both plates is generated by means of the girder resulting there from, out of upper plate penetrating, so to speak, into the lower plate.

In arranging the friction weld assembly, one can form it to such an extent that the tip protrudes from the lower plate. It is, however, also possible to arrange the friction weld assembly only to such an extent that the tip is enclosed by the material of the lower sheet part.

Advantageously, the tip may be additionally hardened. A particularly hard tip may, however, also achieved thereby that the tip is covered with a material which is harder as compared to the material of the slender cone. The penetration into the plate is facilitated with a tip processed in this way.

It is also possible to attach a hard tip as a supplementary peace at the metal peace, for example by welding.

The slender cone forming the connection body, can in addition to its effect to act as connection body fulfill additionally further functions, i.e. as bold or nut where the slender cone comprises a blind hole for this purpose. In order to take up the plastified material flowing out in direction of the collar upon friction welding, in particular out of the upper plate, one conveniently provides the collar on its side facing the upper plate, with a groove.

One can extend the friction welding zone across the area of the girders up to the side of the collar facing the upper metal part, whereby a particularly high strength is given to the friction weld zone.

A particularly intensive connection between the connection body and the upper plate may be achieved thereby that the collar is coated with a hot melt adhesive on its side facing the upper plate. The hot melt adhesive is heated also during the developing of the friction weld arrangement and is, thereby, liquefied and provides after cooling down an additional connection between the collar and the plate, wherein this connection provides, furthermore, a corrosion protection.

It is frequently required to strengthen in particular a particularly thin plate. In this case, the friction weld assembly can be used in an advantageous way in that the one plate is namely formed as a reinforcement for the other plate. Both plates are, thereby, fixedly connected to each other by means of the friction weld assembly, whereby the necessary strength of the connection is given to the plate extending beyond the reinforcement, whereby both plates are locked with respect to each other for the purpose of friction welding.

In order to give guidance to the slender cone upon putting it down and turning it into both plates, at least one of both plates can be provided with a hole. In particular, the upper plate is concerned here which takes up the tip of the slender cone with a hole, wherein, however, the hole or the holes respectively naturally have to be so narrow that still sufficient material for the friction welding and the formation of the girders is available by means of the slender cone from the walls of the holes. Furthermore, a faster penetration of both plates results thereby.

The material for a particularly hard tip of the connection body might be advantageously provided also thereby that a drive pin is added to the connection body which pin forms the tip of the connection body. In this case, there is, consequently, a two part arrangement of the connection body.

Metal can be used in the first place as material for the plates and the connection body, it is, however, also possible to implement the plates and the connection body from plastics or a material combination.

Embodiments of the invention are shown in the drawing.

FIG. 1 shows two superposed plates and above thereof the connection body prior to its lowering onto the plates.

FIG. 2 shows the connection body as rotated into both plates by forming a friction weld zone and girders at the two plate wherein the connection body is completely enclosed by the material of the lower plate.

FIG. 3 is a similar arrangement as it is shown in FIG. 2, however, with a tip of the connection body protruding from the lower plate.

FIG. 4 shows a connection body having a threaded bolt.

FIG. 5 shows a connection body provided with a co-axial blind hole.

FIG. 6 shows a connection body having a recess at the lower edge of its collar.

FIG. 7 shows a connection body as rotated into two plates while forming a friction weld zone extending up to below the collar of the connection body.

FIG. 8 shows a connection body having a layer out of hot melt adhesive at the lower edge of its collar.

FIG. 9 shows a connection body with two plates one of which forms a reinforcement.

FIG. 10 shows a connection body with plates previously provided with holes.

FIG. 11 shows a connection body with plates only the upper one of which is previously provided with holes.

FIGS. 12 and 13 show a connection body adapted to be assembled from two parts.

In FIG. 1, two superposed plates 1 and 2 as well as a connection body 3 are shown comprising a collar 4 formed as a hex-head, a slender cone 5 forming essentially the largest length of the connection body 3, and, as a continuation thereof, a steeper, short cone 6. The connection body 3 and the two plates 1 and 2 are shown in a position in which they are prior to the beginning of the production of a friction weld assembly.

The friction weld assembly formed from the structural parts shown in FIG. 1, is shown in FIG. 2. By rotating and pressure inserting the connection body 3, it penetrates the plates 1 and 2, wherein it does not completely penetrate the plate 2. During the operation of the friction welding of the connection body 3 by means of the penetration of the short cone 6 and the slender cone 5 into the material of the two plates 1 and 2, there results, because of the rotation of the connection body, such a high friction with respect to the material of the plates 1 and 2 that a friction welding zone which is shown by the bold line 7, is formed along the slender cone 5 and the steep cone 6. Therein, out of the plate 1 and also out of the plate 2, a girder 8 and a girder 9 each are pressed out of the plates 1 and 2, wherein the girder 8 extends in part into the area of the material of the plate 2 and the girder 9 forms a coating over the short cone 6 and the tip 10.

Because of this arrangement, there results a strong connection between the plates 1 and 2 which extends across the friction welding zone 7 and which can be exposed to substantial separation forces without it being able to disengage from the connection with both plates 1 and 2.

In FIG. 3, a modification of the representation in FIG. 2 is shown in which the slender cone is formed so long that the tip 10 of the connection body penetrates the plate 2 completely and penetrates the lower plate completely with the area of the short cone and the tip 10 and extends out of it. In FIG. 3, the friction welding zone is again provided with the reference number 7. The connection bodies shown in the FIGS. 1 to 3, have, at their upper rim, a collar each which is formed as a hex-head. The respective connection bodies can, therefore, be easily inserted by means of an appropriately fast running rotation tool by which the connection body can than be put into the required rotation by which the friction welding zone 7 is produced.

The connection body according to FIG. 4 comprises a further specific feature. Its sender cone 13 runs steadily out into the tip 13 with an equal cone angle, the friction welding zone of this connection body than extends continuously equally from the collar 4 to the tip 13. Any further structural element can than be fixed to the bolt 13 with its threads.

Which shape of the connection body, i.e. with a steep, short cone or with continuous slender cone is chosen for the respective application, depends on the materials into which the connection body has to be rotated.

In FIG. 5, a connection body is shown which is similar to the one of the FIGS. 1 and 2. However, the cone of the connection body 4 is shaped differently from what is shown in FIGS. 1 and 2 since a steep end cone 16 which finally ends in the tip 17, follows with a rounded transition 15 to the slender cone 14. Furthermore, the connection body 3 of FIG. 5 has a blind hole 18 which is, for example, provided with an interior thread in order to screw a bolt into the connection body 3 later on.

In FIG. 6, a connection body is shown which corresponds largely to the connection body 3 of the FIGS. 1 to 3, however, it has an interior drive 19 into which any tool having a corresponding outer engagement surface can be inserted for the purpose of entrainment for rotation. Furthermore, the connection body 3 comprises, at the lower side of its collar 20, a groove 21 which serves to take up material coming up upon driving the connection body into the superposed plates 1 and 2 and to be welded there with, if applicable.

In FIG. 7, a connection body is shown which corresponds largely to the one of FIG. 3. However, the connection body is screwed into both plates 1 and 2 to such an extent that a friction welding zone is formed also at the lower side of the collar which zone is continuously connected to the friction welding zone along the slender cone. The friction welding zone 22 below the collar 4 is, if applicable, generated by a particularly strong pressure insertion of the connection body into the plates 1 and 2, whereby, after cooling down of the friction welding zone, a particularly strong connection results between the connection body and the two plates 1 and 2.

In FIG. 8, a connection body similar to the one according to FIG. 1 is shown which, however, is covered with hot melt adhesive 23 at the lower side of its collar. Upon engagement of the collar 4 of the connection body 3 to the upper plate, a friction between the hot melt adhesive 23 and the upper surface of the respective plate is resulting whereby the hot melt adhesive is liquefied and finally, after formation of the friction welding zone and the following completion of the drive of the connection body, presses against the upper plate and finally also forms, upon cooling down of the hot melt adhesive 23, also in this area a similar connection which can particularly be used for sealing purposes and as corrosive protection.

The friction weld assembly according to the invention can also be used for the purpose to correspondingly process a relatively thin plate out of the reasons of a desired reinforcement. This is shown in FIG. 9. A substantially thicker support plate 25 serving as a reinforcement of the thinner plate 24 is provided here below the lower plate 24. The respective area of the plate 24 is given a particularly high stiffness by means of the reinforcement plate 25. Therein, a particularly high strength is given to the overall structure by means of the dimples 26 and the corresponding receiving means in the support plate 25. Therein, the girders 8 and 9 are formed as in the embodiments according to FIGS. 2 and 3.

In the FIGS. 10 and 11, a connection body similar to the one according to FIG. 3 is shown which could be inserted here into sheet plates 1 and 2 previously provided with holes. In FIG. 10, it is a through hole 27 extending through both plates 1 and 2, whereas, in the other one according to FIG. 11, only the upper plate 1 is provided with a through hole 28. In both cases, their results like with the arrangement according to claim 3, the formation of girders and a friction welding zone on the surface by which both plates 1 and 2 are firmly connected to each other, whereby only the through hole 27 or 28, respectively, provides for a fast screwing of the connection body into the plates which can be advantageous in particular with very solid row materials.

In the FIGS. 12 and 13, a further modification of the connection body is shown in which the tip is formed not by the connection body itself but by a driver pin 29. The driver pin 29 may be inserted into the through hole 30 of the connection body 31 and extends through it upon complete insertion, as shown in FIG. 13, to such an extent that the slender cone 32 of the connection body 31 merges substantially without transition with the obtuse cone 34 with the tip 33. The drive of the driver pin 29 is affected here by means of the hex-head 35 at the end of the driver pin 29 which fits into the corresponding receiving means 36 in the collar 37 of the connection body 31. The drive of the connection body 31 is affected here through a hex-head as in the arrangement according to FIG. 1. The driver pin 29 is particularly advantageous in case it has a high hardness and can, therefore, penetrate into hard row materials. It is possible to withdraw the driver pin 29 after completed welding and to use it for further friction welding operations.

The invention claimed is:

1. A friction welding assembly comprising:
    a plurality of superposed plates which are held together by a connection body having a collar which rests on a upper most late of the plurality of plates,
    the connection body comprising:
    a driving element of the collar for attachment of a pressure and rotation tool, and
    a slender cone below the collar, and
    a tip at a lower end of the connection body,
    wherein when the slender cone extends through the plurality of plates, a friction welding region is formed between the connecting body and each of the plurality of plates, and at least the tip of the connection body protrudes from a lower most plate of the plurality of plates,
    wherein the friction welding region includes:
    a girder of the upper most plate which extends into the lower most plate, and
    a girder of the lower most plate,
    the girders of the upper and lower most plates having inner surfaces which form the friction welding region between the slender cone and each of the plurality of plates.

2. The friction welding assembly according to claim 1, wherein the tip is formed by a short cone which is steeper as compared to the slender cone.

3. The friction welding assembly according to claim 1, wherein the tip is surrounded by material of the lower most plate.

4. The friction welding assembly according to claim 1, wherein the tip is additionally hardened.

5. The friction welding assembly according to claim 1, wherein the tip is coated by a material which is harder than a material of the slender cone.

6. The friction welding assembly according to claim 1, wherein the tip is fixed to the slender cone as an additional part.

7. The friction welding assembly according to claim 1, wherein the slender cone merges into a bolt.

8. The friction welding assembly according to claim 1, wherein the slender cone includes a blind hole.

9. The friction welding assembly according claim 1, wherein the collar includes a groove on a side facing the upper most plate.

10. The friction welding assembly according to claim 1, wherein the friction weld region extends up the upper most plate to a side of the collar facing the upper most plate.

11. The friction welding assembly according to claim 1, wherein the collar is coated with hot melt adhesive on a side facing the upper most plate.

12. The friction welding assembly according to claim 1, wherein the one of the upper and lower most plates is formed as a reinforcement of the other of the upper and lower most plates.

13. The friction welding assembly according to claim 1, wherein at least one of the upper and lower most plates is provided with holes.

14. The friction welding assembly according to claim 2, wherein the short cone is formed by a driving means penetrating a through hole in the slender cone,
    wherein the driving means forms a continuation of the slender cone and is adapted to be fit into a respective receiving means on the collar, and the slender cone is arranged opposite to the short cone.

15. The friction welding assembly according to claim 1, wherein the upper and lower most plates and the connection body are formed of metal.

16. The friction welding assembly according to claim 1, wherein the upper and lower most plates and the connection body are formed of plastics material.

17. The friction welding assembly according to claim 1, wherein the upper and lower most plates are formed of different raw materials.

18. The friction welding assembly according to claim 1, wherein the upper and lower most plates are formed of plastics and the connection body is formed of metal.

19. The friction welding assembly according to claim 1, wherein the connection body includes a plastic coating.

20. A friction welding assembly comprising:
    a plurality of superposed plates including an upper most plate and a lower most plate, and
    a connection body comprising:
    a collar,
    a slender cone below the collar, and
    a tip below the slender cone, and
    the collar including a driving element for attachment of a pressure and rotation tool for driving the slender cone of the connection body through the plurality of plates,
    wherein the friction welding assembly is formed by driving the tip and the slender cone of the connection body through each of the plurality of superimposed plates in order to form a hole in each of the plates with a rim surrounding each of the holes, and a friction welding region formed between the slender cone and an inner surface of each of the rims of the plates,
    the friction welding assembly so formed including:
    the plurality of superimposed plates held together by the friction welding region between the slender cone and the inner surface of each of the rims,
    the collar resting on the upper most plate, and
    the tip protruding below the lower most plate.

* * * * *